United States Patent [19]

Malmros et al.

[11] 4,081,063
[45] Mar. 28, 1978

[54] OVERLOAD RELEASE CLUTCH

[75] Inventors: Edward T. Malmros, Clark; Franz J. Swart, Rahway, both of N.J.

[73] Assignee: Centric Clutch Company, Woodbridge, N.J.

[21] Appl. No.: 705,438

[22] Filed: Jul. 15, 1976

[51] Int. Cl.² .................................................. F16D 43/20
[52] U.S. Cl. .............................. 192/56 F; 192/85 AT
[58] Field of Search ............... 192/56 F, 150, 85 AT; 64/29; 81/52.4 R, 52.4 A

[56] References Cited

U.S. PATENT DOCUMENTS

| | | | |
|---|---|---|---|
| 2,429,091 | 10/1947 | Dodge et al. | 64/29 X |
| 2,683,512 | 7/1954 | Boice | 192/56 F |
| 2,842,240 | 7/1958 | Rice et al. | 192/56 F |
| 2,963,134 | 12/1960 | Banner | 81/52.4 R X |
| 3,132,730 | 5/1964 | Dahlstrand et al. | 192/56 L |
| 3,419,117 | 12/1968 | Conway | 192/56 F X |
| 3,608,334 | 9/1971 | Zinner | 64/29 |
| 3,664,474 | 5/1972 | Blake | 192/60 |

*Primary Examiner*—Allan D. Herrmann
*Attorney, Agent, or Firm*—Fitzpatrick, Cella, Harper & Scinto

[57] ABSTRACT

An overload release clutch mechanism which includes a housing member and a rotor member mounted for relative rotation and means associated with said members for effecting transmission of rotary movement from one of said members to the other end being effective to disengage said members upon the application of a torque exceeding a predetermined value to one of said members is equipped with means operative at any time during the operating cycle of the mechanism to vary the torque level at which disengagement occurs. The members are held in engagement to transmit such rotary movement by fluid under pressure and the means operative to vary the torque level at which disengagement occurs control the pressure of said fluid.

25 Claims, 7 Drawing Figures

OVERLOAD RELEASE CLUTCH

BACKGROUND OF THE INVENTION

1. Field of the Invention

This invention relates to a clutch mechanism through which a machine may be driven, and more particularly, to such a mechanism which will disengage upon occurrence of an overload in the driven machine, the clutch mechanism including means for varying its torque output during operation.

2. Description of the Prior Art

Overload clutches are known which are capable of disengaging upon the occurrence in the driven machine of an overload requiring a clutch torque output which exceeds a predetermined value, as disclosed in U.S. Pat. Nos. 2,781,118 and 3,132,730, for example. However, as far as we are aware, such known clutches offer inadequate protection in respect of a great number of commercial applications wherein the driven machine has a high starting inertia but a relatively low running torque since the clutch must be able to accommodate the starting inertia, thus establishing the maximum torque value at which the clutch will respond in the event of an overload. Thus, if during running at low torque an overload occurs in the driven machine which does not reach the level of the starting inertia, the clutch will not disengage, thereby offering no protection for that condition.

An additional disadvantage of known overload clutches is their inability to accommodate conditions wherein the driven machine develops different torque levels during its running cycle. Thus, in some instances, while normal running generally is at relatively low torque, temporary high torque levels will occur as part of the normal running cycle, and such temporary high torque levels may cause known overload clutches to disengage, thus undesirably interrupting the normal operation cycle.

Additionally, when the driven machine is intentionally shut down by shutting down the prime mover, the inertia in the driven machine causes a high torque to be applied to the clutch. In this condition, disengagement will occur if that torque exceeds the torque for which the clutch is set; but continued engagement under this condition is desired so that the prime mover, clutch and driven machine will be set for start-up for the next operational cycle.

Those persons skilled in the art will appreciate the need for a clutch of the class described which can (1) accommodate high starting inertia; (2) respond to an overload at low running torque; (3) adjust its output torque during operation of the driven machine to accommodate normal running torque variations while at all times providing rapid overload protection; and (4) accommodate stopping torque without disengaging.

We have actually constructed a successfully operating and commercially desirable overload clutch based upon those requirements.

SUMMARY OF THE INVENTION

In essence, our invention contemplates an overload clutch mechanism comprising a housing member, a rotor member, means mounting the members for relative rotation, means associated with the members for effecting transmission of rotary movement of one of the members to the other of the members by effectively engaging the members, the last-mentioned means being effective to disengage the members upon application of a torque exceeding a predetermined value to one of the members, and means operative at any time during the operating cycle of the mechanism to vary the torque level at which disengagement occurs.

According to one aspect of our invention, the means for effecting transmission of rotary movement of one of the members to the other includes at least one pawl formed with cam means and carried by one of the members for radial movement relative thereto, cam means associated with the other of the members and adapted to cooperate with the cam means of the pawl. One of the cam means may be in the form of a notch and the other may be in the form of a projection adapted to mate with the notch. At least one pin is carried by said one of the members for movement at an angle, preferably 90°, relative to the direction of movement of the pawl, the pawl and pin having engageable cam surfaces whereby the pin is effective normally to retain the pawl in rotary movement transmitting position, the pawl being effective to shift the pin to disengage the engageable cam surfaces when the pawl moves radially upon application of a torque exceeding a predetermined value to one of the members thus to terminate cooperation between the pawl cam means and the cam means of said other of the members.

Our invention also contemplates control means for controlling the effectiveness of the rotary movement transmission means to maintain the members effectively engaged, the control means being responsive to fluid under pressure for determining the torque level at which the rotary movement transmitting means disengages the members. The control means may include a piston adapted to contact the pin or pins, as the case may be, normally to maintain engagement of the engageable cam surfaces, and means applying fluid at a predetermined pressure to the piston. Actually, one of the members, such as the housing member, may include a cylinder and a piston moveable in the cylinder and adapted to contact the pin, or pins, to maintain the cam surfaces engaged.

The cylinder may be formed with vent means normally closed to the fluid under pressure and we provide valve means to vent the cylinder to release the fluid pressure on the piston upon application to one of the members of a torque exceeding the torque level established by the fluid under pressure acting on the piston. More specifically, the vent means may include a passage extending from the cylinder to the valve means which is opened by a solenoid to effect communication between the cylinder and atmosphere when an overload occurs, i.e., upon application of a torque value exceeding the torque level established by the fluid under pressure acting on the piston.

We also provide second normally closed valve means including means adapted to sense relative movement between the housing and rotor members when an overload torque is applied to one of them. In one embodiment of the invention, this second valve means further includes a passage extending through the piston and a valve member adapted to seat against the piston to close the passage and shift to open position upon relative movement between the housing and rotor members as occurs due to an overload condition. When this valve means is open, communication is established between the cylinder and atmosphere through the passage in the piston and a suitable vent opening. The valve means of this embodiment preferably take the form of a triangular-shaped stem moveable axially in the piston passage and having an enlarged head at one end adapted to seat against a mating surface formed on the piston for that purpose. The opposite end of the stem extends beyond the piston and is shaped with a cam surface and fits into a recess in one of the members, such as the rotor member. When an excessive torque or overload occurs, the housing and rotor members rotate relatively to one another and the recess walls cam the valve stem to unseat the head and open the valve, effecting communication between the cylinder and atmosphere through the piston passage.

The valve stem is partially bored from the head end, a spring is positioned at the base of the bore and a pin extends from the spring to the surface of the housing member forming the head of the cylinder. The stem is thus urged to seated or closed position with its stem projecting beyond the piston to position its cam surface in the recess of the rotor member. We also provide means such as springs to urge the piston away from the pin means when the cylinder is vented.

In many applications, it is important that the rotor and housing members be in a particular phase alignment during running. For this purpose, the second valve member functions to assure proper phase alignment of these members at start-up. Thus, in the event that, after disengagement, these members are not in phase, one of them, the rotor for example, may be jogged or indexed by means which will later be described to effect proper phase alignment. If after disengagement, the members are out of alignment, the valve stem will be out of alignment with its cooperating recess in the rotor, as described, and will bear against the unrecessed surface of the rotor so that it will not be able to close the piston passage, wherefore even if fluid pressure is applied to the piston, it will not urge the pins and pawls into position effectively to engage the rotor and housing members. However, by jogging or indexing the rotor, its recess will be brought to position facing the valve stem which will enter the recess under the force of its spring, thus to seal the piston passage and allow fluid pressure in the cylinder to drive the piston against the pins to cam the pawls into clutch engaing position.

Those skilled in the art will appreciate that the torque output of our clutch mechanism can readily be varied as required during operation of the driven machine to accommodate any number of variations in torque requirements simply by varying the air pressure acting against the cylinder. Such variations can be achieved by any convenient means such as by timed control of suitable pressure regulation apparatus, for example.

The control means that we have already alluded to include means that may conveniently take the form of a plate or ring exterior of the cylinder, but moveable with the piston to actuate appropriate circuitry for indexing, starting and running, and stopping and for indicating the condition of the clutch mechanism.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention has been chosen for purposes of illustration and description, and are shown in the accompanying drawings, forming a part of the specification wherein.

DESCRIPTION OF THE PREFERRED EMBODIMENTS

Figure 1:
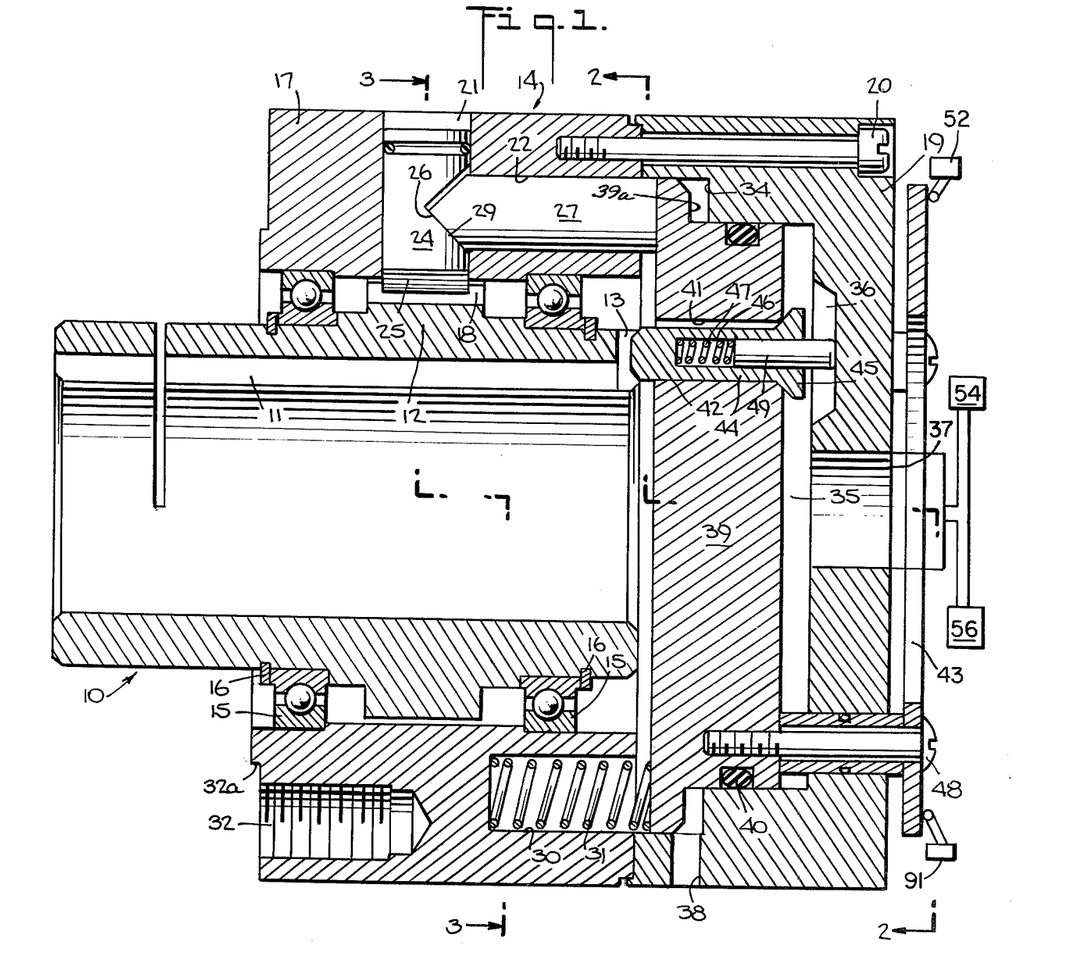
FIG. 1 is a sectional view of an overload release clutch mechanism illustrating an embodiment of the present invention.

Referring now to the drawings, and more particularly to FIG. 1, there is shown a tubular rotor 10 arranged for connection to the output shaft of a prime mover by means of a keyway 11. The rotor is flanged at 12, is formed with a recess 13 in its right hand end as viewed (see also FIG. 4), and is mounted for relative rotation in respect of a housing 14 by means of ball bearings 15 retained against shoulders conveniently formed on the exterior surface of the rotor by snap-rings 16 set in grooves provided for that purpose. The flange 12 is formed with a series of annularly equidistantly spaced V-shaped notches or cam surfaces 18 facing radially outwardly of the rotor 10.

Figure 2:
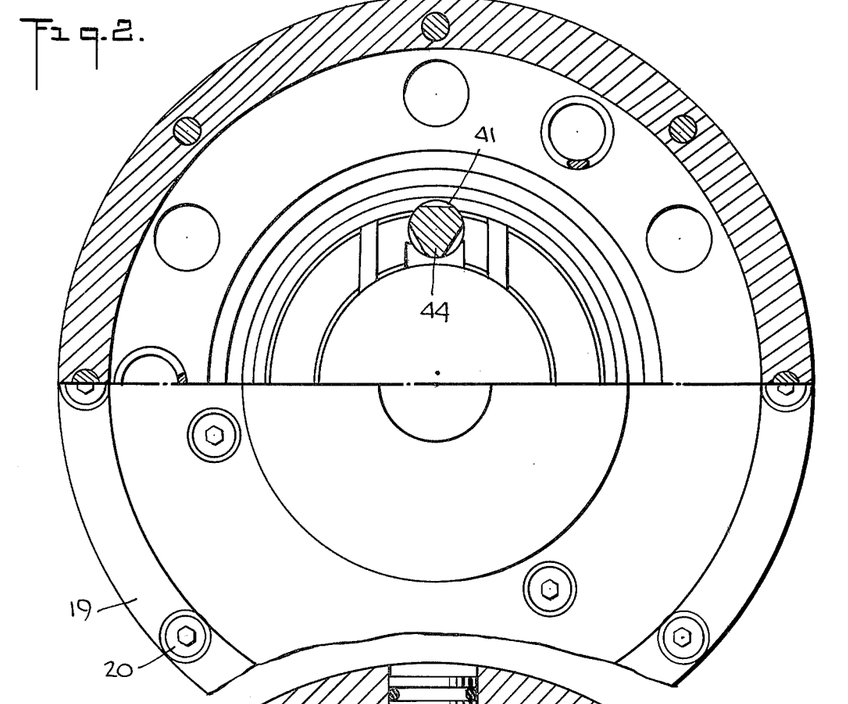
FIG. 2 is a partial sectional view taken along the line 2—2 of FIG. 1.

The housing 14 comprises a ring portion 17 and a head 19 bolted together by cap screws 20, as shown in FIGS. 1 and 2.

The ring portion 17 of the housing 14 is provided with a plurality of annularly equidistantly spaced radial bores 21 (six such bores being employed in the present embodiment), and an equal number of through bores 22 parallel to the longitudinal axis of the mechanism and each communicating with a respective bore 21.

Figure 3:
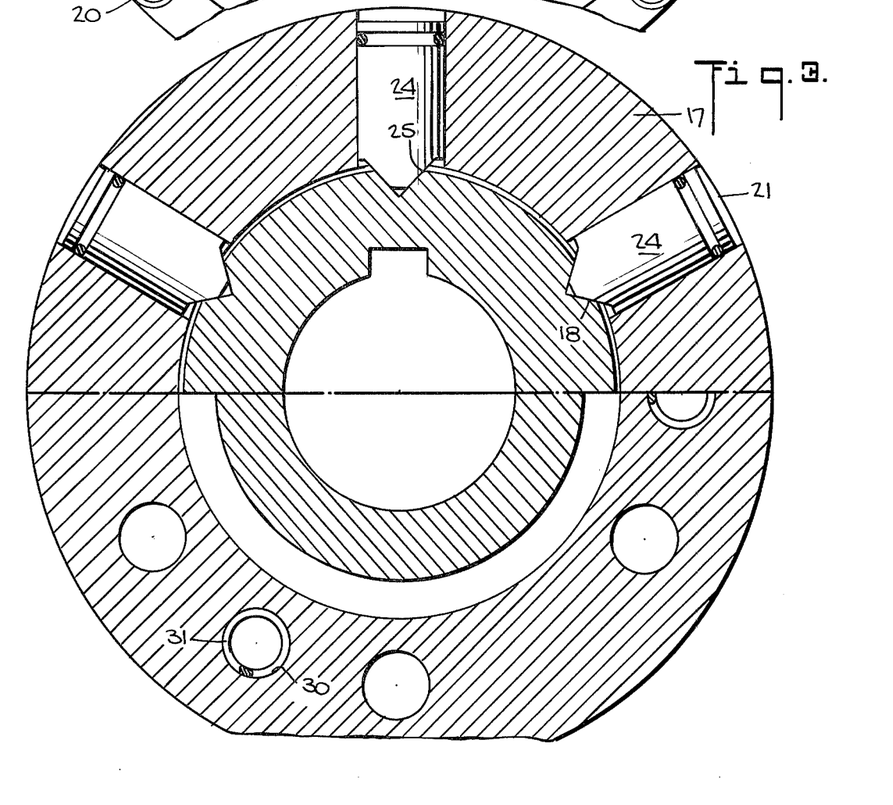
FIG. 3 is a sectional view taken along the line 3—3 of FIG. 1.

Within each of the radial bores 21, we position a pawl 24 (FIGS. 1 and 3) each of which is formed with a pointed cam surface 25 at its inner end and a V-shaped notch or cam surface 26 facing its respective bore 22; and within each of the bores 22 we position a pin 27 having a pointed cam surface 29 adapted to engage the cam surface 26 of a respective pawl 24.

The ring portion 17 of the present embodiment is also provided with three annularly equidistantly spaced bores 30 opening towards the head 19 and in each of which is seated a helical spring 31 for a purpose later to be described. We also form mounting bores 32 and a shoulder 32a in the left hand end of the ring portion 17 of the housing for mounting a sprocket or the like by which drive power may be transmitted from the housing to the driven machine although it will be understood that the housing may be arranged to transmit driven power by any convenient means.

The head 19 of the housing 14 is bored and counterbored to provide an internal shoulder 34 and a cylinder 35, the closed end of which is recessed at 36 and is provided with a central through bore 37. Moreover, the cylinder 35 is vented through its side by an opening 38.

A piston 39 is disposed for reciprocating movement in the cylinder 35, and is formed with an annular recess for reception of a sealing O-ring 40, an annular shoulder 39a adapted to cooperate with the shoulder 34 to limit the movement of the piston under the influence of the springs 31 which bear against the face of the piston, and a through bore 41 opposite the recesses 13 and 36.

Figure 4:
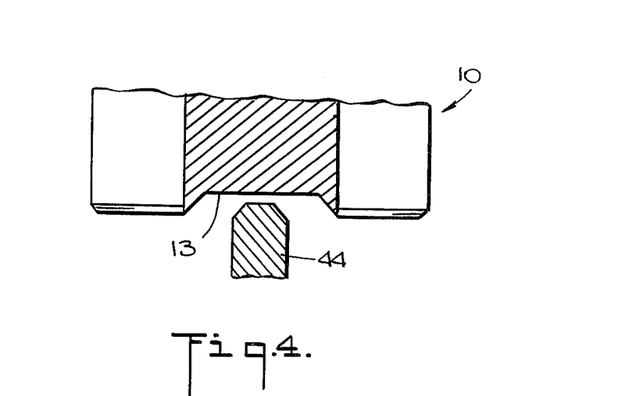
FIG. 4 is a detail view, partly in section, illustrating part of the second valve means and the rotor recess.

The end of the bore 41 facing the recess 36 in the head 19 is chamfered to form a valve seat and a valve member 42, comprising an elongate stem 44 and a valve head 45, is disposed for axial movement in the bore 41. The valve member 42 is formed with a bore 46 extending through the valve head and partially into the stem, and a spring 47 is disposed at the base of this bore to bear against the end of a pin 49 in the bore 46 to urge the pin against the base of the recess 36 formed in the head 19 of the housing 14. In the position of the parts as shown, the valve head 45 is seated and the stem 44 extends beyond the bore 41 into the recess 13 formed in the end of the rotor 10. As best shown in FIGS. 1 and 4, the ends of the recess 13 and the corresponding end of the stem 44 are beveled to form cooperating cam surfaces; and as best shown in FIGS. 1 and 2, the stem is generally triangular in cross-section while the bore 41 is circular.

From the description thus far, it will be appreciated that the clutch mechanism is shown in coupled or engaged position, that is, with the pawls 24 in their radially inward positions so that the pointed cam surfaces 25 thereof are engaged with a respective V-shaped cam surface of the rotor flange 12. The pawls are maintained in this position by the pins 27, the cam surfaces 29 of which are engaged with respective cam surfaces 26 of the pawls. The pins 27 are prevented from shifting out of engagement with the pawls by the piston 39 bearing against the opposite end surfaces of the pins, and the piston is in turn maintained in this position by fluid pressure, such as air pressure, admitted into the cylinder 35 through the bore 37.

It will be noted that, in the position shown, the stem 44 of the valve member 42 extends into the recess 13 of the rotor and the valve head 45 is seated against the piston thus preventing the flow of fluid from the cylinder through the bore 41 to the vent opening 38. The clutch mechanism is in normal operation condition and its torque output is determined by the air pressure in the cylinder 35 acting on the piston 39.

In the event that, while starting or running, an overload develops in the driven machine requiring a greater torque output than that for which the clutch is set by the air pressure acting on the piston 39, the overload torque will be transferred to the rotating housing 14 which will tend to stop rotating while the prime mover continues to drive the rotor. The cooperating cam surfaces 18 and 25 of the rotor and pawls, respectively, will act to shift the pawls radially outwardly camming the pins 27 to the right, as viewed, by the cooperative action of the cam surfaces 26 and 29. Thus, the piston 39 will start to move away from the rotor, the extent of its movement being limited by the shoulder 34, and a trip plate 43 will shift the piston to actuate a solenoid valve to vent the cylinder in a manner later to be described. Meanwhile, the beveled surface of the recess 13 in the rotor acting on the beveled end of the valve stem 44 will shift the valve member 42 to the right to unseat the head 45. The springs 31 maintain the piston 39 in its last position.

The clutch mechanism is thus disengaged so that rotation of the rotor 10 is not transferred to the housing 14 and the driven machine.

It will be noted that the pawls 24 are each provided with an annular recess for maintaining an O-ring in engagement with the wall of its respective bore 21. These O-rings seal the bores against dirt and dust and retain the pawls in disengaged position so that their cam ends do not bear against the rotor which continues to rotate until the prime mover is shut down.

When it is desired to re-engage the clutch mechanism, the valve stem 44 may be out of alignment with the recess 13 of the rotor wherefor the valve cannot close so that any air under pressure admitted to the cylinder would simply be vented and would not act on the piston, and the springs 31 would prevent the piston from acting on the pins 27. This feature assures that the device can operate only when the rotor and housing are in desired alignment thus in turn assuring synchronous operation of driven machines, when synchronism is necessary. This alignment is achieved by jogging the rotor until the recess 13 aligns with the valve stem 44, whereupon the spring 47 causes the valve to seat and air pressure admitted to the cylinder is effective to force the piston against the springs 31 to shift the pins 27 axially towards the pawls 24. The cam surfaces 29, acting on the pawl cam surfaces 26, shift the pawls radially inwardly to mate with the notches 18 in the rotor flange 12, whereupon the clutch mechanism is again engaged.

The piston 39 is connected to the aforementioned trip plate 43 which may be of any suitable configuration but is shown as a ring exterior of the cylinder, by means of cap screws 48 extending through bushed and sealed bores in the cylinder head. Thus, the plate 43 moves with the piston and can be used for control purposes such as actuation of switch means to operate the solenoid valve to vent the cylinder.

Since the housing rotates during normal operation, the bore 37, through which air is admitted to the cylinder, is fitted with a rotary union which may be of the type manufactured and sold by Deublin Co. of Northbrook, Illinois under Model No. 1102, for example.

As mentioned earlier, the initial starting torque necessary to overcome the inertia of the driven machine may be of a different and higher value than that required for running, and during running, the normal cycle of the driven machine may require varying clutch torque outputs to assure complete protection. Those skilled in the art will appreciate that the torque output of the present clutch mechanism can be varied as necessary, according to the needs of each application, by varying the fluid pressure acting on the cylinder 39; and that such variations can be effected by any suitable pressure regulating means while the machine is running.

Figure 5:
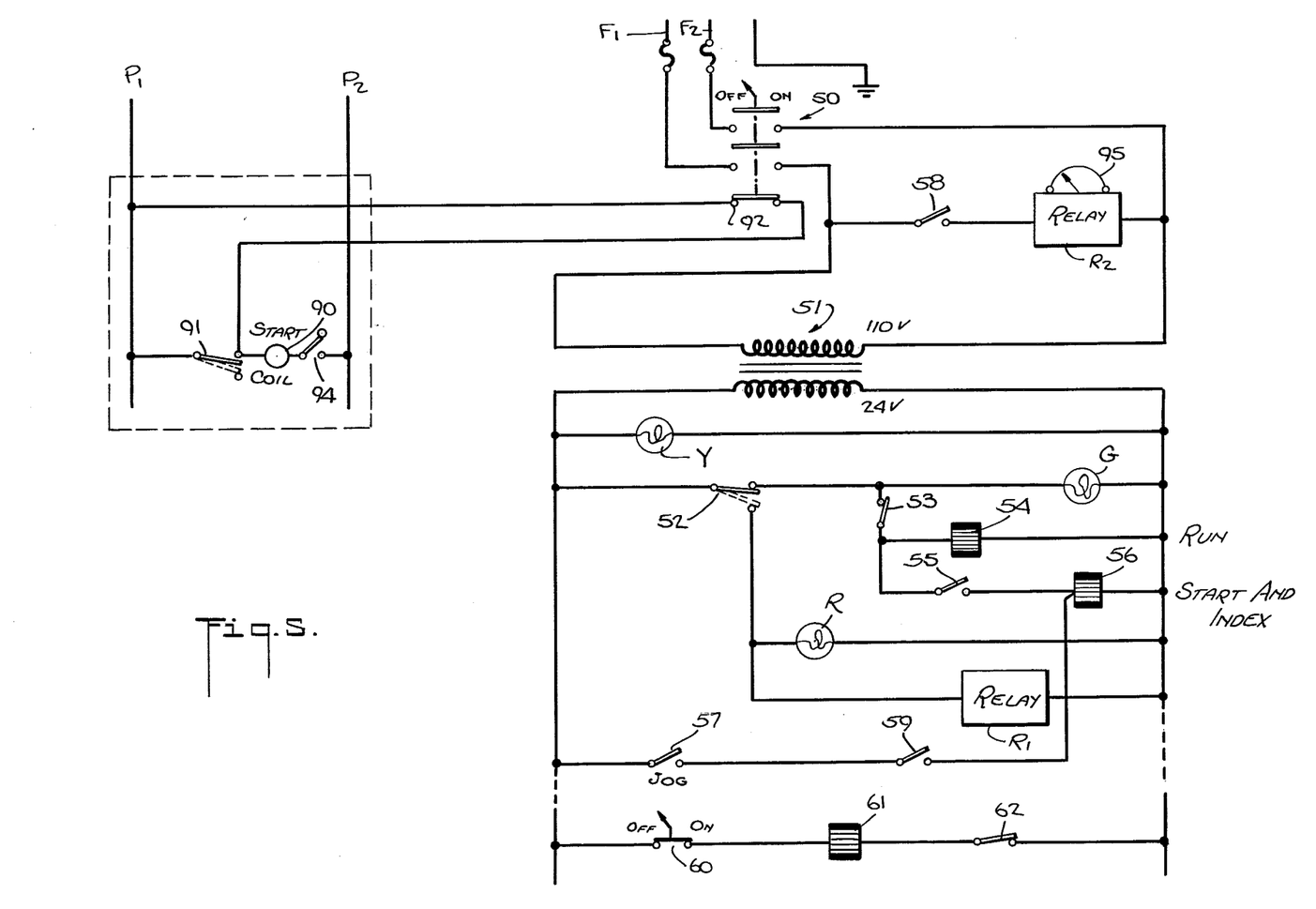
FIG. 5 is a circuit diagram illustrating one embodiment of a basic control circuit for operating the clutch mechanism.

Turning now to FIG. 5, we illustrate a circuit for basic control of the clutch mechanism. The power supply is shown as a single phase F1, F2 three wire circuit, the third wire being grounded. A power switch 50 is operative to energize the primary coil of a transformer 51 to provide the desired voltage to an operating circuit which includes a lamp Y connected in parallel with the secondary coil of the transformer to indicate the availability of power in the operating circuit. A second lamp G is serially connected with a single pole double throw micro-switch 52, shown in position to energize lamp G, these in turn being connected across the transformer output. In a first sub-circuit we connect a solenoid 54 in parallel with the lamp G, and in a second sub-circuit we serially connect a normally open switch 55 and a solenoid 56, in parallel with the lamp G. In its position shown in broken lines the micro-switch 52 energizes a lamp R and a relay R1 connected as shown, and de-energizes the lamp G and both sub-circuits. A normally open jog switch 57 is connected from one side of the transformer through a normally open switch 59 to the second sub-circuit at a point between the switch 55 and the solenoid 56.

When the power switch 50 is moved to an on position, the lamp Y is energized to indicate that power is available and the lamp G is energized to indicate that starting may be effected by closing switch 55 if the rotor and housing members are in phase. If not in phase and jogging is necessary, the plate 43 will have shifted the switch 52 into the dotted line position and will be holding it there so that the lamp G is off and the lamp R is on. When the jog button 57 is intermittently closed, the rotor 10 rotates by energizing the prime mover through suitable contactors (not shown). Also, current passes to start and index relay 56 through switch 59 held closed by relay R1, and this process is continued until valve member 42 enters the recess 13, the valve closes, thus readying the cylinder and piston 39 to receive and hold fluid under pressure, and the plate 43 shifts switch 52 to solid line position, de-energizing lamp R and relay R1 to open switch 59, and to energize lamp G. The switch 55 is closed by relay R2 when energized by manual start switch 58 and in turn operates solenoid valve 56 to admit air at starting pressure to the cylinder so that normal running commences.

The solenoid 54 controls a valve supplying air to the cylinder at running pressure. As stated, when the housing and rotor members are in phase, relay R1 is de-energized, the switch 52 being in solid line position. It should be understood that relay R1 also controls normally closed switch 53 so that when that relay is energized, the clutch being disengaged and switch 52 being in dotted line position, the switch 53 is opened to prevent current from back feeding to the lamp G to indicate that the clutch is engaged when in fact it is not.

When an overload occurs, the piston and its plate 43 shift to the right as viewed in FIG. 1, the switch 52 is shifted to dotted line position by the action of the plate 43 de-energizing solenoid 54 and 56 venting the cylinder through a valve (not shown) controlled by solenoid 56 to de-energize the lamp G and to energize the lamp R to indicate that the clutch is disengaged, and the valve 42 opens.

In certain cases, an unusually high starting torque may be required and emergency energizing power is needed to start the driven machine. Accordingly, we provide an energizing circuit across the transformer comprising a normally open switch 60, a solenoid 61 and a normally closed switch 62, all serially connected. In such a case, the clutch will have disengaged after completion of the previous operation. The operator jogs the clutch as described above until the clutch is in phase, at which time the emergency circuit is actuated. Thus, upon closing the switch 60, the solenoid 61 will act to admit high pressure to the cylinder 35. The switch 62 is closed at this time because the relay R1 which controls that switch is de-energized since the clutch is engaged and micro-switch 52 is in the solid line position by reason of the position of the trip plate 43 which controls its position. Meanwhile, the switch 55 is maintained closed by the relay R2. The emergency circuit is thus employed to provide emergency power for starting under these conditions.

We also provide for running the machine when the clutch is disengaged from the power source. Thus, if the clutch is on a branch line of a machine, for instance, and it is desired to disconnect the branch, the power switch 50 is turned off disconnecting the drive through the clutch and effectively closing the machine power switch 92 to the starting coil 90 of the machine and the micro-switch 91 is shifted to the dotted line position by the trip plate. The operator may then operate the driven machine by closing the switch 94, which is an automatic reset switch that also is opened when the clutch disengages, thus delivering operating power to the machine start coil through source P1 P2. It will therefore be appreciated that we incorporate into our overload release clutch mechanism a feature permitting operation of the driven machine when the clutch is disengaged.

As indicated, one of the principle advantages of our clutch is its ability automatically and precisely to vary the overload torque value at which disengagement occurs. Thus, the driven machine will require a high starting torque, a relatively low normal running torque, a high stopping torque, and it may require running torque variations. If the clutch can respond only to a single torque value during operation, it must be set for the highest anticipated torque; but while running at a low torque, no protection is offered for torques which may occur at a value between running and starting torque. Since the present clutch employs the pressure of a fluid such as air to determine its torque output, that output may be varied on the fly, i.e., during operation by varying the fluid pressure acting on the piston. This can be achieved by the use of a fluid pressure controlling timer 95 in lieu of the relay R2. The timer can be pre-set to vary the pressure in the cylinder as needed during the operating cycle by operating pressure regulating solenoid valves. Thus, for example, when switch 58 is engaged, time relay 95 starts to time out and at the end of its adjustable time cycle it moves switch 55 to the open position cutting off the high pressure air being delivered to the cylinder under the control of solenoid 56 and forcing the air to pass through the low pressure line being supplied under the control of solenoid 54 effectively to vary the pressure to the cylinder 35.

Figure 6:
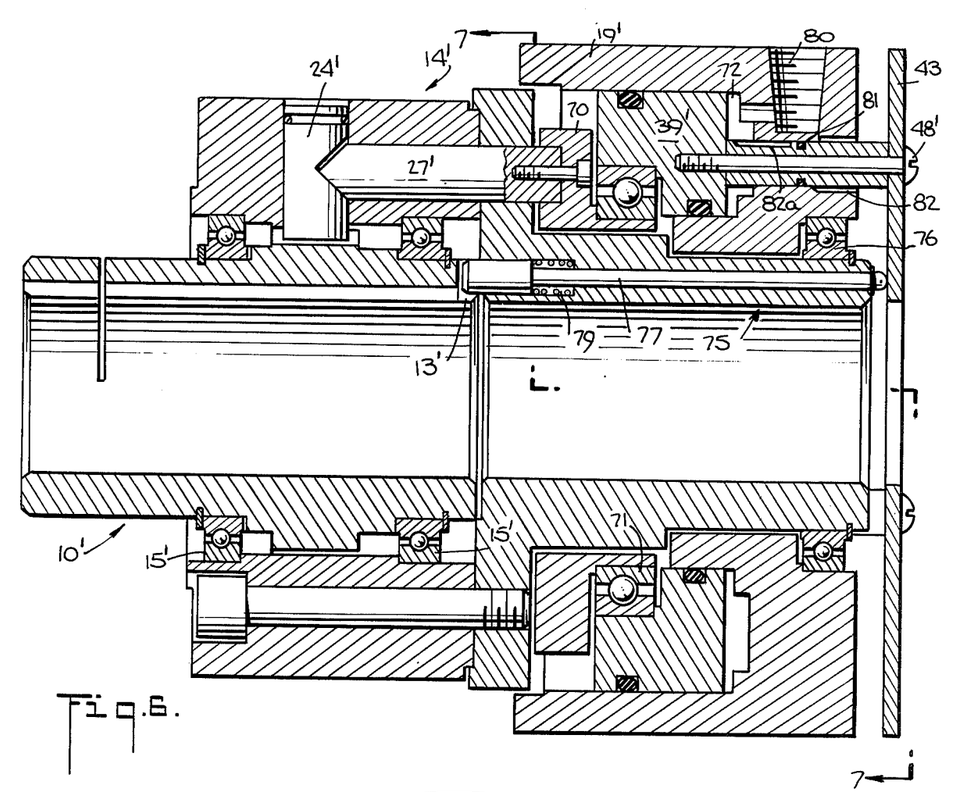
FIGS. 6 and 7 are similar to FIGS. 1 and 2 but illustrate a second embodiment of our invention.
Figure 7:
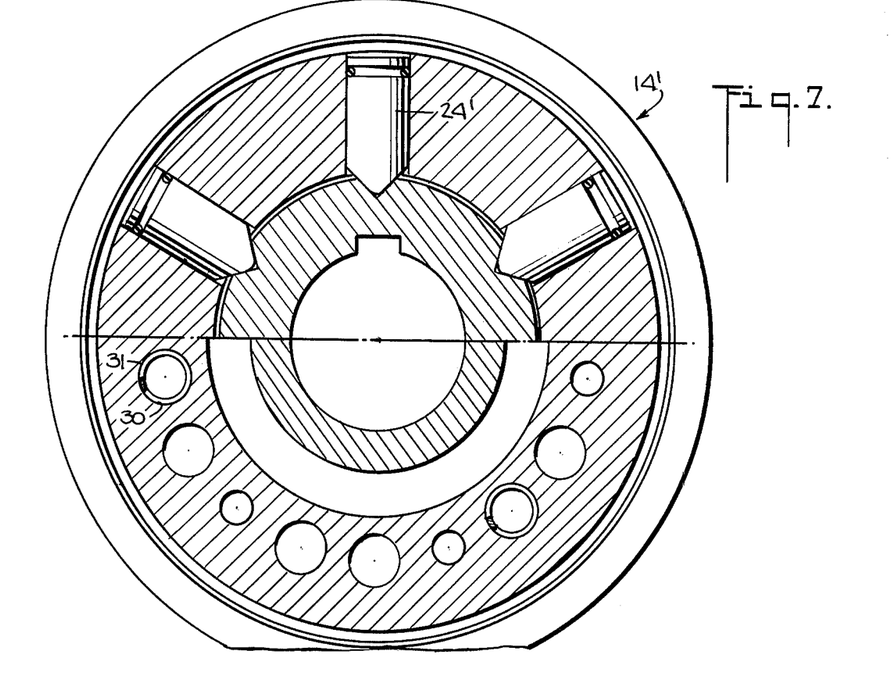

Turning now to FIGS. 6 and 7, a second embodiment of the clutch mechanism is disclosed. The rotor 10' and housing 14' are mounted for relative rotation by bearings 15' and housing is bored to receive pawls 24' and pins 27' as in the first embodiment. In the present case however, the pins 27' are secured by cap screws to a pressure plate 70 which is rotatable relative to an annular piston 39' through bearing 71. The piston is mounted in a cylinder 72 formed in a head 19' and carries an exterior trip plate 43' by means of screws 48' extending through bushed and sealed bores in the head 19'. The piston is in the shape of an annulus which permits a shaft to enter the clutch from the right, as viewed, in axial alignment with a shaft keyed to the rotor. In this way, the clutch mechanism may be employed in a shaft-to-shaft arrangement as when it is desired to locate it between a drive motor and reduction mechanism.

In this embodiment, it will be seen that the pins 27' pass through a bored flange of a generally cylindrical hub drive member 75 of the housing, this member and the head 19' being mounted for relative rotation by bearing 76. The rotor 10' is formed with recess 13' in its right end, as viewed, and a trip out pin 77 extending through a suitable bore in the drive member has an enlarged end adapted to enter the recess 13' under the influence of a spring 79 bearing between a shoulder on the pin 77 and an opposing shoulder in the member 75. The pin extends through the member 75 and bears against the trip plate 43'. This pin 77 serves the same purpose as the pin 49 in the embodiment of FIG. 1.

In the present case, the piston 39' does not rotate but reciprocates axially in the cylinder with the trip plate to which it is attached, as already mentioned; and the cylinder 72 is provided with a fluid inlet 80.

The parts, as shown in FIG. 6, are in engaged position. When an overload occurs, the piston and plate 43' are shifted to the right by the pins 27' acting through the pressure plate 70, the plate 43' shifting switch 52 (FIG. 5) to dotted line position to vent the cylinder as already described in connection with the first embodiment. As shown, one of the screws 48' extends through a bushing sealed by an O-ring 81 in a bore extending through the head 19'. This bore is counterbored at 82 to a depth such that when disengagement occurs and the piston shifts to the right, the seal 81 overrides the base of the bore 82 allowing the cylinder to open to atmosphere along the outside of the bushing and through counterbore 82, the bore being internally slotted as at 82a to facilitate same. Thus, the pin 77 and the elements 48', 82 and 82a serve a purpose similar to pin 49 and valve 42 of the previously described embodiment.

From the foregoing description it will be seen that we provide an overload release clutch mechanism which can adjust its output torque during operation so that it can, for example, accommodate high starting inertia, respond to an overload at low running torque, accommodate normal running torque variations and accommodate stopping torque without disengaging. Our clutch can also provide emergency operating torque and can permit running of the driven machine when the clutch is disengaged.

We believe that the construction and operation of our novel overload release clutch mechanism will now be understood and that the several advantages thereof will be fully appreciated by those persons skilled in the art.

We claim:

1. An overload release clutch mechanism comprising; a housing member, a rotor member, means mounting said members for relative rotation, means associated with said members for effecting transmission of rotary movement of one of said members to the other of said members by effectively engaging said members, said last mentioned means being effective to disengage said members upon the application of a torque exceeding a predetermined value to one of said members, and means operative at any time during the operating cycle of said mechanism automatically to vary the torque level at which disengagement occurs.

2. An overload release clutch mechanism according to claim 1, wherein said means for effecting transmission of rotary movement of one of said members to the other of said members includes at least one pawl formed with cam means and carried by one of said members for radial movement relative thereto, cam means associated with the other of said members and adapted to cooperate with said cam means of said pawl, one of said cam means being in the form of a notch and the other being in the form of a projection adapted to mate with said notch, and at least one pin carried by said one of said members for movement at an angle relative to the direction of movement of said pawl, said pawl and said pin having engageable cam surfaces whereby said pin is effective normally to retain said pawl in rotary movement transmitting position, said pawl being effective to shift said pin to disengage said engageable cam surfaces when said pawl moves radially upon application of a torque exceeding a predetermined value to one of said members and terminating cooperation between said pawl cam means and the cam means of said other of said members.

3. An overload release clutch mechanism comprising; a housing member, a rotor member, means mounting said members for relative rotation, means associated with said members for effecting transmission of rotary movement of one of said members to the other of said members by effectively engaging said members, said last mentioned means being effective to disengage said members upon the application of a torque exceeding a predetermined value to one of said members, control means controlling the effectiveness of said last mentioned means to maintain said members effectively engaged, said control means being responsive to fluid under pressure for determining the torque level at which said means for effecting transmission of rotary movement of one of said members to the other of said members disengages said members, and means for automatically varying the pressure of the fluid under pressure at any time during the operating cycle of said mechanism whereby the torque at which disengagement of said members occurs may automatically be varied as required during each cycle of operation.

4. An overload release clutch mechanism according to claim 3, wherein said means for effecting transmission of rotary movement of one of said members to the other of said members includes at least one pawl formed with cam means and carried by one of said members for radial movement relative thereto, cam means associated with the other of said members and adapted to cooperate with said cam means of said pawl, one of said cam means being in the form of a notch and the other being in the form of a projection adapted to mate with said notch, and at least one pin means carried by said one of said members for movement at one angle relative to the direction of movement of said pawl, said pawl and said pin having engageable cam surfaces whereby said pin is effective normally to retain said pawl in rotary movement transmitting position, said pawl being effective to shift said pin to disengage said engageable cam surfaces when said pawl moves radially upon application of a torque exceeding a predetermined value to one of said members and terminating cooperation between said pawl cam means and the cam means of said other of said members, said control means including a cylinder and a piston in said cylinder adapted to contact said pin means normally to maintain engagement of said engageable cam surfaces and means applying fluid at a predetermined pressure to said piston.

5. An overload release clutch mechanism according to claim 4, wherein means are provided for varying the pressure of the fluid under pressure at any time during the operating cycle of said mechanism.

6. An overload release clutch mechanism according to claim 4, wherein means movable with said piston are provided for actuating means for sealing and venting said cylinder.

7. An overload clutch release mechanism according to claim 3, wherein said means for effecting transmission of rotary movement of one of said members to the other of said members includes at least one pawl formed with cam means and carried by one of said members for movement relative thereto, cam means associated with the other of said members and adapted to cooperate with said cam means of said pawl, at least one pin carried by said one of said members for movement at an angle relative to the direction of movement of said pawl, said pin being effective normally to retain said pawl in rotary movement transmitting position, said pawl being effective to shift said pin to render same ineffective to retain said pawl in rotary movement transmitting position upon the application of a torque exceeding a predetermined value to one of said members, said control means including a cylinder and a piston in said cylinder adapted to bear against said pin under the influence of said fluid under pressure, and means associated with said members to maintain said fluid under pressure acting on said piston when said members are disposed in a predetermined phase relationship and otherwise venting said fluid.

8. An overload release clutch mechanism according to claim 7, wherein means are provided for varying the pressure of the fluid under pressure at any time during the operating cycle of said mechanism.

9. An overload release clutch mechanism according to claim 7, wherein means movable with said piston are provided for actuating means for sealing and venting said cylinder.

10. An overload release clutch mechanism according to claim 7, wherein said means maintaining said fluid under pressure includes a passage extending through said piston and valve means having a valve member adapted to seat against said piston to close said passage and to shift to open position and means sensing the phase relationship of said members and controlling said valve means.

11. An overload release clutch mechanism according to claim 10, wherein means are provided for varying the pressure of the fluid under pressure at any time during the operating cycle of said mechanism.

12. An overload release clutch mechanism according to claim 10, wherein means movable with said piston are provided for actuating means for sealing and venting said cylinder.

13. An overload release clutch mechanism according to claim 7, wherein said housing member includes a head, said means maintaining said fluid under pressure includes a passage in said head and valve means in said passage, seal means effective to seal said passage in one position of said valve means and to relieve said fluid under pressure in a second position of said valve means, and means sensing the phase relationship of said members and controlling said valve means.

14. An overload release clutch mechanism according to claim 7, wherein said means maintaining said fluid under pressure includes a valve member having a stem and a head and a passage extending through said piston, said head being adapted to seat against said piston and said stem having a cross-section of different configuration than that of said passage and extending through and beyond said piston passage, the end of said stem opposite said head having a cam surface adapted to enter a recess formed in the member other than the member in which said piston is located whereby, upon relative rotation of said members, said valve member is cammed to unseated position to vent said cylinder.

15. An overload release clutch mechanism according to claim 14, wherein said valve member is partially bored from its head end, a pin is positioned in said bore and abuts against the cylinder head, and a spring is provided in said bore bearing against said stem and said pin resiliently to urge said valve member towards closed position.

16. An overload release clutch mechanism comprising; a housing member, a rotor member, means mounting said members for relative rotation, pawl means including a cam surface carried by one of said members for radial movement relative thereto, cam means associated with the other of said members and adapted to cooperate with said cam surface for transmission of rotary movement of one of said members to the other of said members, pin means carried by said one of said members for movement at an angle relative to the direction of movement of said pawl means, said pawl and pin means having normally engageable cam surfaces whereby when said engageable cam surfaces are in engagement said pin means is effective to maintain said pawl means in rotary movement transmission position relative to said members, said one of said members including a cylinder, a piston movable in said cylinder and adapted to apply a force against said pin means normally to maintain engagement of said engageable cam surfaces, and means applying fluid at a predetermined pressure to said piston.

17. An overload release clutch mechanism according to claim 16, wherein means are provided for varying the pressure of the fluid under pressure at any time during the operating cycle of said mechanism.

18. An overload release clutch mechanism according to claim 16, wherein said cylinder is provided with fluid vent means normally closed to the fluid under pressure and valve means are provided to vent said cylinder thus to release the fluid pressure on said piston upon application to one of said members of a torque exceeding the torque level established by the fluid under pressure acting on said piston.

19. An overload release clutch mechanism according to claim 18, wherein said rotor member and said housing member are coaxially bored for the reception of drive and driven shafts, respectively, in end to end relation.

20. An overload release clutch mechanism according to claim 16, including means for sensing the phase relationship of said members and effective to permit fluid pressure to be maintained in said cylinder only when said members are in a desired phase relationship.

21. An overload release clutch mechanism according to claim 20, wherein said sensing means include a bore through one of said members, indicating means on the other of said members, a stem in said bore and means urging said stem towards said member having the indicating means to sense same and shift its position in said bore when the desired phase relationship is established.

22. An overload release clutch mechanism according to claim 21, wherein said indicating means is a recess formed in said rotor member and said bore extends through said piston and said stem controls valve means to maintain same in open or closed position depending on its position in said bore.

23. An overload release clutch mechanism according to claim 22, including means for jogging one of said members relative to the other of said members until said stem is in alignment with said recess whereby said means urging said stem towards said recess closes said valve means.

24. An overload release clutch mechanism according to claim 20, including means for jogging one of said members relative to the other of said members to establish said desired phase relationship.

25. An overload release clutch mechanism comprising; a housing member, a rotor member, means mounting said members for relative rotation, pawl means including a cam surface carried by one of said members for radial movement relative thereto, cam means associated with the other of said members and adapted to cooperate with said cam surface for transmission of rotary movement of one of said members to the other of said members, pin means carried by said one of said members for movement at an angle relative to the direction of movement of said pawl means, said pawl and pin means having normally engageable cam surfaces whereby when said engageable cam surfaces are in engagement said pin means is effective to maintain said pawl means in rotary movement transmission position relative to said members, said one of said members including a cylinder, a piston movable in said cylinder and adapted to apply a force against said pin means normally to maintain engagement of said engageable cam surfaces, means applying fluid at a predetermined pressure to said piston, and means movable with said piston and operative to actuate a solenoid valve to vent said cylinder upon the application to one of said members of a torque exceeding the torque level established by the fluid under pressure acting on said piston.

* * * * *